United States Patent [19]
Injeyan et al.

[11] Patent Number: 5,841,805
[45] Date of Patent: Nov. 24, 1998

[54] THREE-LEVEL LASER SYSTEM

[75] Inventors: Hagop Injeyan; Jacqueline G. Berg, both of Glendale, Calif.

[73] Assignee: TRW Inc., Redondo Beach, Calif.

[21] Appl. No.: 783,646

[22] Filed: Jan. 14, 1997

[51] Int. Cl.[6] ........................................... H01S 3/09
[52] U.S. Cl. ........................ 372/69; 372/39; 372/40; 372/70; 372/71; 372/75
[58] Field of Search ................................ 372/39, 40, 41, 372/68, 69, 70, 71, 75, 92, 99, 43

[56] References Cited

U.S. PATENT DOCUMENTS

| | | | |
|---|---|---|---|
| 3,611,190 | 10/1971 | Keefe | 331/94.5 |
| 4,713,820 | 12/1987 | Morris et al. | 372/41 |
| 4,876,694 | 10/1989 | Hughes | 372/93 |
| 4,949,346 | 8/1990 | Kuper et al. | 372/36 |
| 5,107,513 | 4/1992 | Sagie et al. | 372/35 |
| 5,148,445 | 9/1992 | Liu et al. | 372/97 |
| 5,181,223 | 1/1993 | Baer | 372/69 |
| 5,224,116 | 6/1993 | Whitley | 372/71 |
| 5,268,920 | 12/1993 | Esterowitz et al. | 372/71 |
| 5,287,378 | 2/1994 | Bowman et al. | 372/68 |
| 5,299,210 | 3/1994 | Snitzer et al. | 372/6 |
| 5,299,220 | 3/1994 | Brown et al. | 372/71 |
| 5,305,345 | 4/1994 | Albrecht et al. | 372/69 |
| 5,315,612 | 5/1994 | Alcock et al. | 372/69 |
| 5,381,431 | 1/1995 | Zayhowski | 372/25 |
| 5,394,420 | 2/1995 | Senn et al. | 372/39 |
| 5,394,427 | 2/1995 | McMinn et al. | 372/70 |
| 5,432,806 | 7/1995 | Snitzer | 372/6 |
| 5,441,803 | 8/1995 | Meissner | 428/220 |
| 5,475,526 | 12/1995 | Byer | 359/330 |
| 5,479,430 | 12/1995 | Shine, Jr. et al. | 372/60 |
| 5,692,005 | 11/1997 | Maag et al. | 372/70 |

*Primary Examiner*—Brian Healy
*Attorney, Agent, or Firm*—Michael S. Yatsko

[57] ABSTRACT

The present invention provides a solid state laser gain medium 28 comprising: (a) a gain layer 30 having pump regions 32 and first and second contact regions 34 and 36, respectively; (b) a first transparent layer 38 optically connected to the first contact region 34 of the gain layer 30 by diffusion bonding; and (c) a second transparent layer 40 optically connected to the second contact region 36 of the gain layer 30 by diffusion bonding. The transparent layers 38 and 40 are transparent to the lasing wavelength of the gain medium 28. The present invention also provides an apparatus for amplifying laser light, comprising: (a) a solid state, slab geometry gain medium 44 having lateral pump faces 46 and a principal radiation absorption axis C; and (b) an excitation mechanism 48 located along the pump faces 46 of the gain medium 44 for generating polarized light along a polarization axis 52 wherein the polarization axis 52 is parallel with the principal absorption axis C of the gain medium 44 to provide increased radiation absorption. The present invention also provides a cooling system 58 for a solid state gain medium 60 generating laser output laser emission at a wavelength from about 2 $\mu$m to about 3 $\mu$m. The cooling system 58 including a coolant material such as D2O for reducing absorption of laser emissions by the coolant at wavelengths from about 2 $\mu$m to about 3 $\mu$m.

36 Claims, 8 Drawing Sheets

28

THREE-LEVEL LASER SYSTEM

BACKGROUND

The present invention relates to solid state lasers and, more particularly, to high energy, long coherence length eyesafe lasers.

Solid state laser gain modules comprise a housing enclosing a solid state laser gain medium such as neodymium yttrium aluminum garnet (Nd:YAG) or neodymium glass, and an optical pumping source for pumping species in the laser gain medium to produce a population inversion. The laser gain medium includes optical pump regions for receiving radiation from the optical pumping source. The optical pumping source is typically a light source which emits over a broad spectrum of wavelengths. Since optical pumping generates a large amount of heat within the laser gain medium and increases the medium's temperature, a cooling system is utilized to control the temperature in the pump regions of the laser gain medium.

In many high energy lasers, the laser gain medium typically has a slab configuration and a rectangular cross-section, and includes optically polished major side and end faces, and lateral pump faces perpendicular to the major side faces. An input light wave impinges on an edges face of the laser gain medium and the electromagnetic radiation emitted by the pumping source impinges upon the pump faces of the laser gain medium to excite the active species to create a population inversion. The interaction of the input light wave with excited atoms amplifies the light wave. The light wave is passed generally along the longitudinal axis of the gain medium by multiple internal zig-zag reflections from the major side faces. These internal reflections average out thermal gradients in the laser gain medium. The light wave is amplified each time it passes through the gain medium to increase gain.

In conventional gain modules, the laser gain medium is typically retained in the gain module using holders which contact the pump faces of the gain medium. Further, sealing means are used to seal coolant flowing across the pump faces of the gain medium. However, a disadvantage of conventional gain modules that the holders and the sealing means block the pump faces from receiving radiation from the optical pump source. The blocked areas form unpumped regions which cause significant losses in laser energy only for 3-level lasers. This is not true for 4-level lasers such as Nd:YAG.

For optical lighting sources, light emitting diodes and laser diodes have been used in place of lamps. Diode lasers provide much closer matching of the absorption peak of the laser gain medium than is possible with broadband lamps. This improved wavelength matching increases the efficiency of solid state laser gain mediums and reduces detrimental heating effects. In case of uni-axial birefringent crystal gain mediums, however, the orientation of thus diodes with respect to the crystal axis has a direct effect on the absorption of the pumping radiation by the gain medium.

A uni-axial crystal typically has a principal radiation absorption axis along which the crystal displays significantly higher absorption of pumping radiation than along other axis of the crystal. A disadvantage of some conventional gain modules using uniaxial crystals is that the light emitting diodes are not optimally oriented with respect to the principal absorption axis of the uni-axial gain medium crystal to maximize absorption of pumping radiation by the gain medium crystal.

Another disadvantage of conventional gain modules is loss of laser energy due to absorption of laser emissions in the cooling system. In existing gain modules, water has been utilized as a coolant to control the temperature of the gain medium. In a typical slab geometry gain medium, the pumping faces of the gain medium are cooled by flowing water over the pumping faces. However, for lasing wavelengths of 2 $\mu$m to 3 $\mu$m, such as in holmium and thulium three-level zig-zag slab geometry lasers, the laser emissions are strongly absorbed by the cooling water. This causes substantial losses in the zig-zag slab, reducing the efficiency of the gain medium. Unlike rods, zig-zag slabs generate evanescent waves which penetrate a short distance into the water coolant flowing across the pumping faces of the slab. Absorption of the evanescent waves by the cooling water attenuates the laser beam.

There is, therefore, a need for a 3-level laser gain module in which there is no loss of lasing energy in the unpumped regions of the laser gain medium. There is also a need for such a module to have diode optical pumping sources oriented optimally with respect to the laser gain medium to maximize radiation absorption by the gain medium. There is also a need for such a module to have a cooling system wherein laser emissions penetrating the coolant are not absorbed by the coolant.

SUMMARY

The present invention satisfies these needs. The present invention provides a 3-level solid state laser gain medium for use in a laser gain module, wherein the gain medium comprises: (a) a gain layer having pump regions and a first and a second contact region, the gain layer generating laser radiation at a lasing wavelength in response to pumping radiation pulses at the pump regions; (b) a first transparent layer optically connected to the first contact region of the gain layer by diffusion bonding; and (c) a second transparent layer optically connected to the second contact region of the gain layer by diffusion bonding. The transparent layers are transparent to the lasing wavelength to reduce absorption of the laser radiation by the transparent layers. The transparent regions are sized to be retained by a retainer in the gain module or to cooperate with a sealing means for sealing coolants. As such, the retainer or sealing means do not block the pump regions of the gain layer and formation of lossy unpumped regions is prevented.

In another aspect, the present invention also provides an apparatus for amplifying laser light, comprising: (a) a solid state, slab geometry gain medium having lateral pump faces and a principal radiation absorption axis; and (b) an excitation mechanism located along the pump faces of the gain medium to generate radiation polarized in parallel with the principal absorption axis of the gain medium for increased radiation absorption. Preferably, the excitation mechanism comprises a set of laser diodes oriented to generate radiation intensity polarized in parallel with the principal absorption axis of the gain medium. The gain medium can be a uni-axial birefringent crystal having a c-axis, and wherein the principal radiation absorption axis is along the c-axis.

Yet in another aspect, the present invention also provides an apparatus for amplifying laser light, comprising: (a) a solid state laser gain medium; (b) an excitation mechanism located proximate the solid state laser gain medium for producing radiation intensity to the gain medium, whereby the gain medium generates laser output laser emission at a wavelength from about 2 $\mu$m to about 3 $\mu$m; and (c) a cooling system located proximate the solid state laser gain medium to provide cooling of the gain medium, the cooling system including a coolant material for reducing absorption of the laser emission by the coolant at said wavelengths. Preferably, the gain medium is a slab geometry solid state gain medium having pump faces, with the coolant flowing across the pump faces, wherein evanescent waves from the gain medium penetrating the coolant are substantially unabsorbed by the coolant. Preferably the coolant consists essentially of $D_2O$.

DRAWINGS

These and other features, aspects and advantages of the present invention will become understood with reference to the following description, appended claims and accompanying drawings where:

DESCRIPTION

Figure 1:
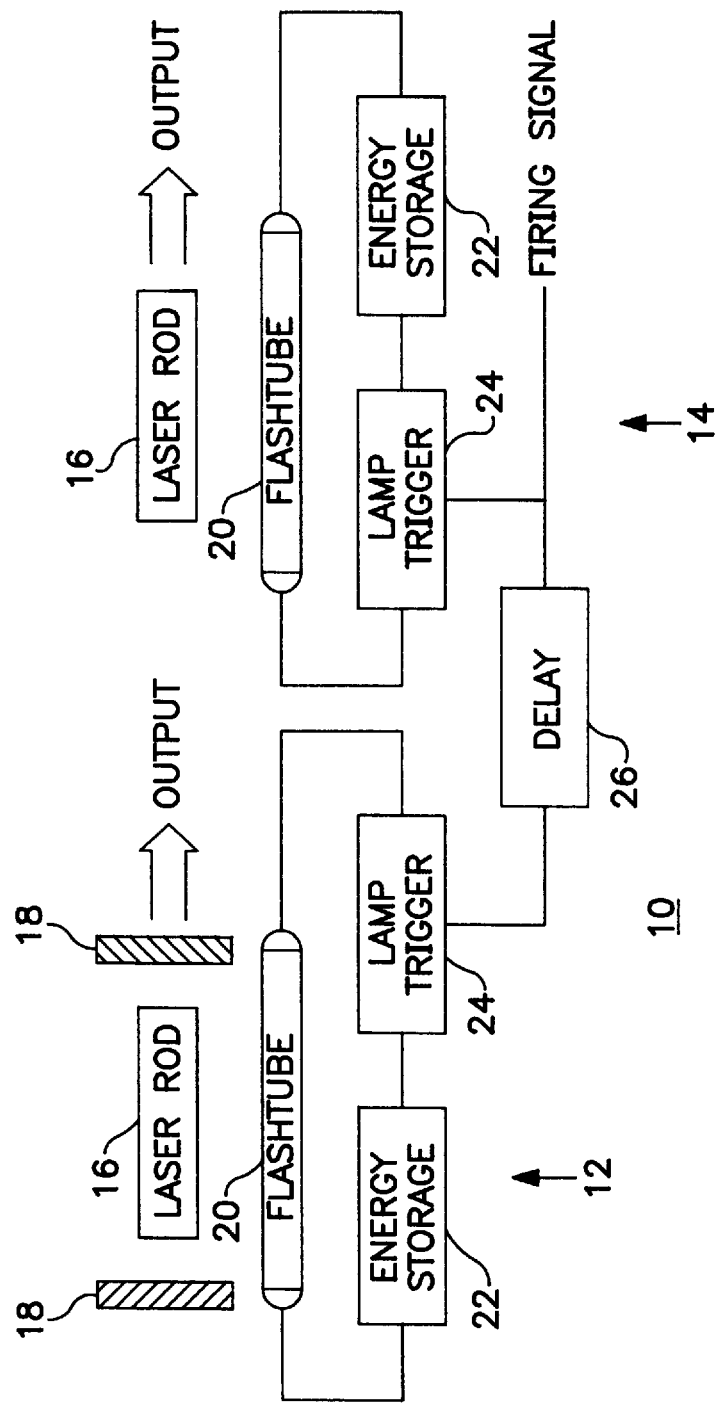
FIG. 1 is a schematic diagram of a conventional laser oscillator-amplifier configuration.

Referring to FIG. 1, a schematic diagram of a conventional laser oscillator-amplifier system 10 is shown. Laser energy is generated by gain in energy of a light beam making passes through an optically active material. Typically, the generation of high-energy pulses is based on the combination of a laser oscillator 12 and a laser amplifier 14. The amplifier 14 is driven by the oscillator 12 which generates an initial light pulse of moderate power and energy. The oscillator 12 includes a laser gain medium 16 such as a laser rod placed between two mirrors 18 one of which provides full reflection and the other partial reflection and partial transmission of light therethrough. A pumping source 20 such as a flash tube generates radiation pulses which are absorbed by the oscillator gain medium 16. In case of a rod, pump light is introduced into the rod, generally normal to the longitudinal axis of the rod between the two end mirrors 18. The system further includes energy storage means 22, lamp triggers 24 and a delay means 26 for controlling the energy and firing sequence of the flash lamps for the oscillator 12 and the amplifier 14.

The laser light energy is produced in the gain medium 16 by photonic emission from active or high energy level ions in the body of the gain medium 16, with the pump light increasing the number of ions from a lower energy level to an upper energy level. The pumping light energy abnormally increases the upper level population of ions and concomitantly depletes the lower level population of ions creating an inversion of energy states. Some of the ions in the upper energy level undergo a spontaneous light emissive transmission to the lower level, and the spontaneously emissive light reflects back and forth between the mirrored surfaces simulating similar light emissive transmissions from other upper level ions. As the stimulated emission reflects back and forth repeatedly through the rod a sufficiently high intensity pulse of laser light energy is emitted by transmission through the partially reflective surface.

Thereafter, the laser light pulse is directed to the amplifier 14 to significantly increase the power and energy of the laser light. The amplifier 14 includes a gain medium 16 such as a laser rod which is exposed to the pumping radiation energy of a pumping source 20 such as a flash tube. The amplifier gain medium 16 is an optically active material in which the power of the pulse generated by the oscillator 12 can grow significantly as a result of the pumping radiation from the pumping source 20.

The gain medium 16 includes pumping regions for receiving radiation energy from the pump source 20. Typically, the gain medium 16 is disposed in the oscillator 12 or the amplifier 14 gain module via holders which are in contact with the pump regions of the gain medium 16. The pump regions are also in contact with sealing means utilized to seal coolants flowing across the pump regions of the gain medium 16. However, in each case, the pump regions of the gain medium 16 are blocked from the pumping radiation of the pumping source 20, forming unpumped regions on the gain medium 16. The unpumped regions cause significant laser energy loss from the gain medium 16 at the unpumped region in 3-level lasers.

Figure 2:
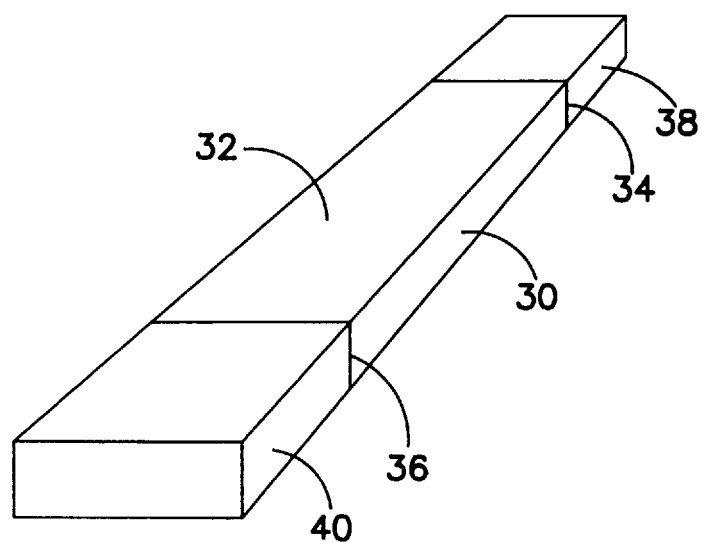
FIG. 2 illustrates a perspective view of an embodiment of a laser gain medium according to the present invention.
Figure 3:
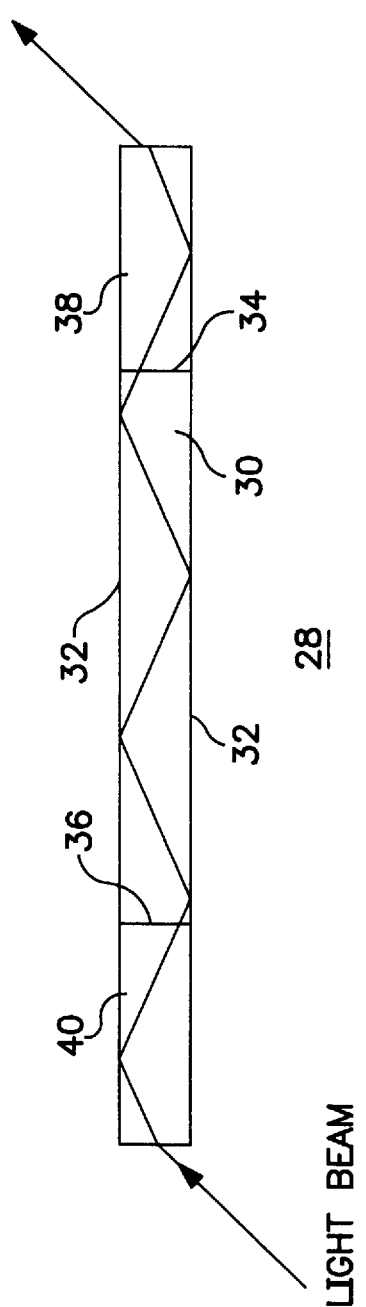
FIG. 3 illustrates a side view of the laser gain medium FIG. 2.

To alleviate this problem, the present invention provides a solid state laser gain medium for use in a laser gain module with reduced laser energy loss. FIGS. 2 and 3 illustrate different views of an embodiment of a laser gain medium 28 according to the present invention. Although the laser gain medium 28 is illustrated in slab geometry form, the present invention contemplates other geometries such as rod or disk. As such, the gain medium 28 of the present invention is not limited to slab geometry in form.

Referring to FIGS. 2 and 3, the laser gain medium 28 comprises: (a) a gain layer 30 having pump regions 32 and first and second contact regions 34 and 36, respectively, the gain layer 30 generating laser radiation at a lasing wavelength in response to pumping radiation pulses at the pump regions 32; (b) a first transparent layer 38 optically connected to the first contact region 34 of the gain layer 30 by diffusion bonding; and (c) a second transparent layer 40 optically connected to the second contact region 36 of the gain layer 30 by diffusion bonding. The transparent layers 38 and 40 are transparent to the lasing wavelength to reduce absorption of the laser radiation by the transparent layers 38 and 40. The transparent layers 38 and 40 can be sized to be retained by a retainer or to cooperate with a sealing means for sealing coolants. As such, the retainer or sealing means do not block the pump regions 32 of the gain layer 30 and prevent formation of lossy unpumped regions.

In the slab geometry form of the gain medium 28, the pumping regions 32 include lateral pumping faces and the contact regions 34 and 36 are substantially transverse to the lateral pumping faces. Preferably, the gain layer 30 and the transparent layers 38 and 40 are of the same crystalline material. The crystal material can be selected from the group consisting essentially of YLF, YAG, YAP, YSGG, YSAG, GSGG, GGG, LiSAF, LiCAF, SFAP and glass. The gain layer 30 is ion doped and the transparent layers 38 and 40 are undoped. The dopant material can be selected from the group consisting essentially of holmium, thulium, chromium, erbium, and ytterbium. The doped regions are subjected to pump radiation from a pump source and the undoped regions are unpumped. As such the undoped regions can be utilized for holding the gain medium 28 and provide coolant sealing.

Diffusion bonding provides optical homogeneity between the gain layer 30 and the transparent layers 38 and 40. The diffusion bonding process for the gain layer 30 and each of the transparent layers 38 and 40 can include: optically contacting the contact regions 34 and 36 of the gain layer 30 to the transparent layers 38 and 40, respectively, to form an assembly; bonding the optically contacted regions by gradually heating the regions to a temperature below the fusion temperature of the regions, but at a temperature and for a time sufficient to diffusion bond the regions; and cooling the bonded structure at a rate which allows the removal of stress by annealing. As such, there is no bonding agent or bonding film is utilized between the bonded layers. Examples of diffusion bonding are described in U.S. Pat. No. 5,441,803 which is incorporated herein by reference.

A laser gain medium 28 according to the present invention is particularly useful for zig-zag slab geometry gain mediums for three-level lasers. In a three-level laser system, initially, all atoms of the gain medium are in a lowest level. Excitation is provided by optical pumping radiation of frequencies which produce absorption into a broad band. Thus, the pump light raises atom, from the ground state to a pump band. In general, the "pumping" band, is made up of a number of bands, so that the optical pumping can be accomplished over a broad spectral range.

Most of the excited atoms are transferred by fast radiationless transitions into an intermediate sharp level. In this process the energy lost by an electron is transferred to the gain medium lattice. Finally, the excited atom returns to the ground level by the emission of a photon. This last transition that is responsible for the laser action. If pumping intensity is below laser threshold, atoms in the intermediate level predominantly return to the ground state by spontaneous emission. After the pump radiation is extinguished, the intermediate level is emptied at a rate that varies from material to material. When the pump intensity is above laser threshold, the decay from fluorescent level consists of stimulated as well as spontaneous radiation; the stimulated radiation produces the laser output beam.

Typically, three-level laser systems with a zig-zag slab require large unpumped regions due to holders or sealing means can cause significant energy loss. As such, a slab architecture requires unpumped regions for holding and sealing which do not cause laser energy loss. The transparent layers 38 and 40 of the gain medium 28 of the present invention advantageously provide transparent layers 38 and 40 of the gain medium 28 that are not pumped and can be utilized for holding and sealing. The transparent layers 38 and 40 eliminate ground state absorption and the associated laser energy loss.

Example specification of a slab configuration gain medium 28 according to the present invention for use in a laser amplifier include:

| Host Material | YLF |
|---|---|
| Concentration | 0.4% Ho, 4% Tm |
| Gain Layer Length | 1 cm–10 cm doped region |
| Transparent Layer Length | 1 ~ | cm undoped region |
| Pump Configuration | Side pumped |

Conventionally, laser emitting diode bars have been used as optical pumping sources by placing the diodes along the length of a gain medium such as a laser rod. A holder is utilized to hold the diode bars along the length of the rod. The bars are placed in close proximity around the bar, indexed at desired angles. However, gain mediums often include uni-axial birefringent crystals. Mary uni-axial crystals have a principal radiation absorption axis along which the crystal displays significantly higher absorption of pumping radiation than along other axis of the crystal. An example of such a crystal is Tm:Ho:YLF with significantly higher absorption of pumping radiation polarized along the c-axis of the crystal. Tm:Ho:YLF is a preferred host material for two-micron lasers because of its high gain per stored energy than other hosts such as Tm:Ho:YAG.

Since YLF is a uni-axial birefringent crystal, it has specific crystal orientations. Therefore, diode emission polarization oriented along the c-axis of the crystal provides higher absorption than along the a-axis. As such, the orientation of optical pumping sources such as laser diodes with respect to the crystal axis has a direct effect on the absorption of the pumping radiation by the gain medium crystal.

Figure 4:
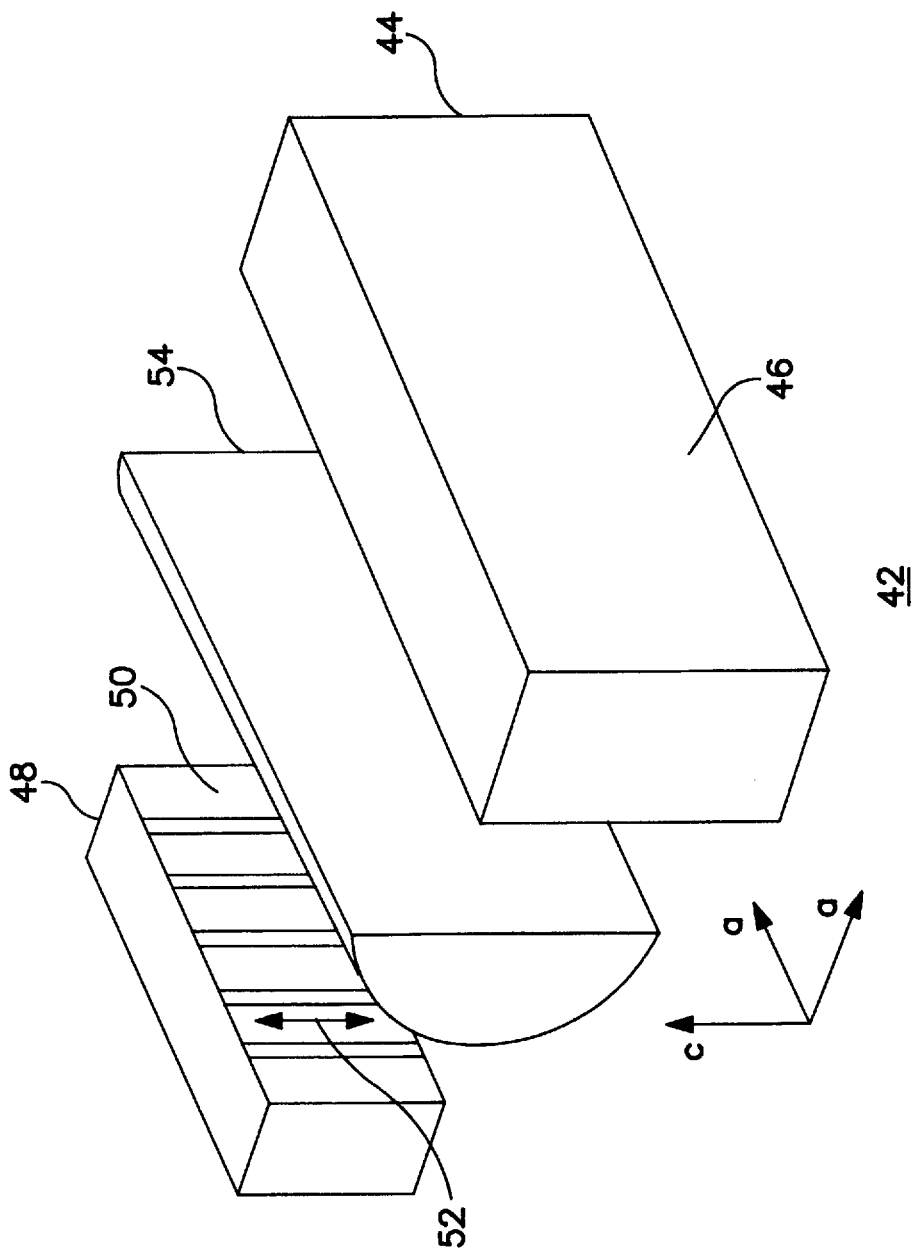
FIG. 4 illustrates a perspective view of orientation of an optical pump system in relation to a uni-axial birefringent crystal according to the present invention.

The present invention provides an apparatus for amplifying laser light including an excitation mechanism optimally oriented with respect to the principal absorption axis of a uni-axial gain crystal to maximize absorption of pumping radiation by the crystal. Referring to FIG. 4, such an apparatus 40 comprises: (a) a solid state, slab geometry gain medium 44 having lateral pump faces 46 and a principal radiation absorption axis C; and (b) an excitation mechanism 48 located along the pump faces 46 of the gain medium 44 for generating polarized light along a polarization axis 52 wherein the polarization axis 52 is parallel with the principal absorption axis C of the gain medium 44 to provide increased radiation absorption. The excitation mechanism 48 preferably comprises set of diode arrays 50 oriented to generate radiation energy polarized along the axis 52.

The gain medium 44 can be a uni-axial birefringent crystal having a c-axis, wherein the principal radiation absorption axis is along the c-axis. The crystal can be selected from the group consisting essentially of Tm:Ho:YLF, Yb:SFAP, Cr:LiSAF.

In the embodiment of the invention shown in FIG. 4, the diodes 50 are vertically oriented and the radiation from the diodes 50 is polarized along the polarization axis 52, parallel to the c-axis of the crystal to yield maximum absorption. A cylindrical lens 54 can be used to focus the diode light in the vertical dimension to confine the pump beam to a smaller volume in the gain medium 44.

An example specification for the diodes 50 shown in FIG. 4 includes:

| Wavelength | 792 nm |
|---|---|
| Bandwidth | 5 nm |
| Number of Diode Bars | 10–250 |
| Arrangement | 10 bar stacks [× 12 on each side of the slab,] mounted on 10 × 40 mm coolers |
| Peak Power | 500–600 W per 10 bar stack |
| Pulse Duration | 1–3 ms |

A substantial amount of pump light energy is necessary to produce laser light. For example, the amount of pumping illumination required to produce laser action in ruby is approximately 500 watts per cubic centimeter of laser rod, and the amount required in neodymium glass is about 50 watts per cubic centimeters. The energy absorbed produces a considerable quantity of heat in the gain medium, and unless special precautions are taken for removal of this heat, deleterious temperature rises will result.

Figure 5:
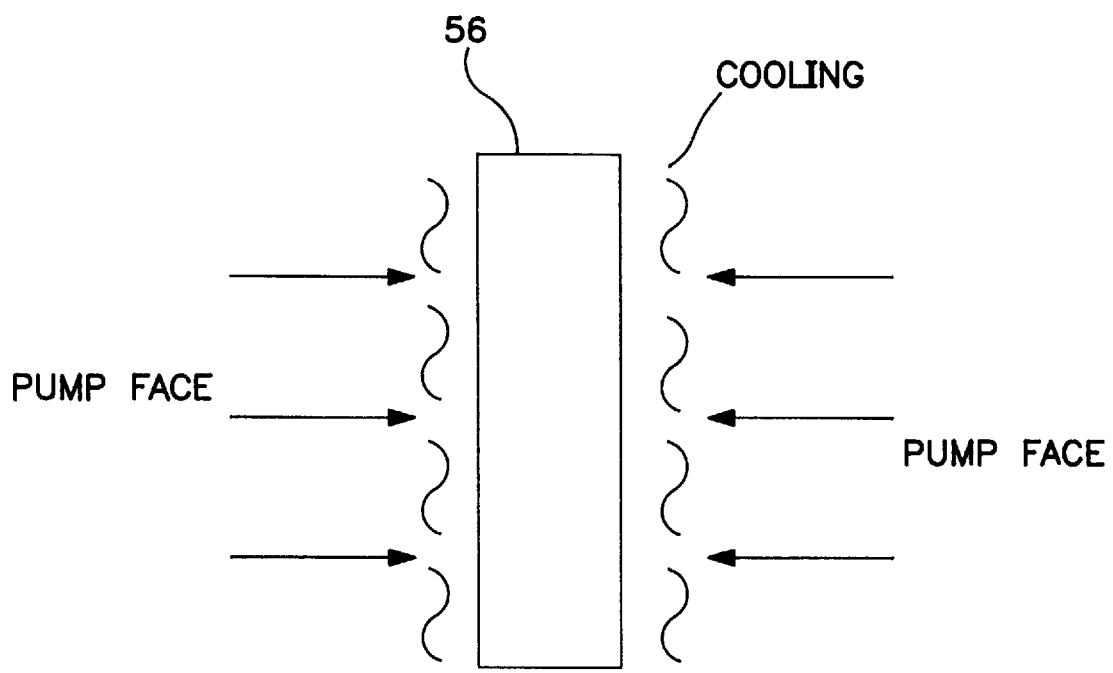
FIG. 5 is an end view of a face-cooled zig-zag slab illustrating coolant flow across the pump faces of the gain medium of FIG. 2.

FIG. 5 illustrates the end view of a zig-zag slab 56 with pump face cooling. Conventionally, zig-zag slabs are face-cooled with water to minimize temperature gradients as shown in FIG. 5. However, laser emissions from about 2 μm to about 3 μm are strongly absorbed by water. For example, holmium and thulium emission at 2 μm and Erbium emission at 2.8 μm are strongly absorbed by water, causing substantial losses in the zig-zag slab. Unlike rods, zig-zag slabs generate evanescent waves which penetrate a short distance into the coolant. The presence of a strong absorber at the surfaces of the slabs can attenuate the beam.

Figure 6:
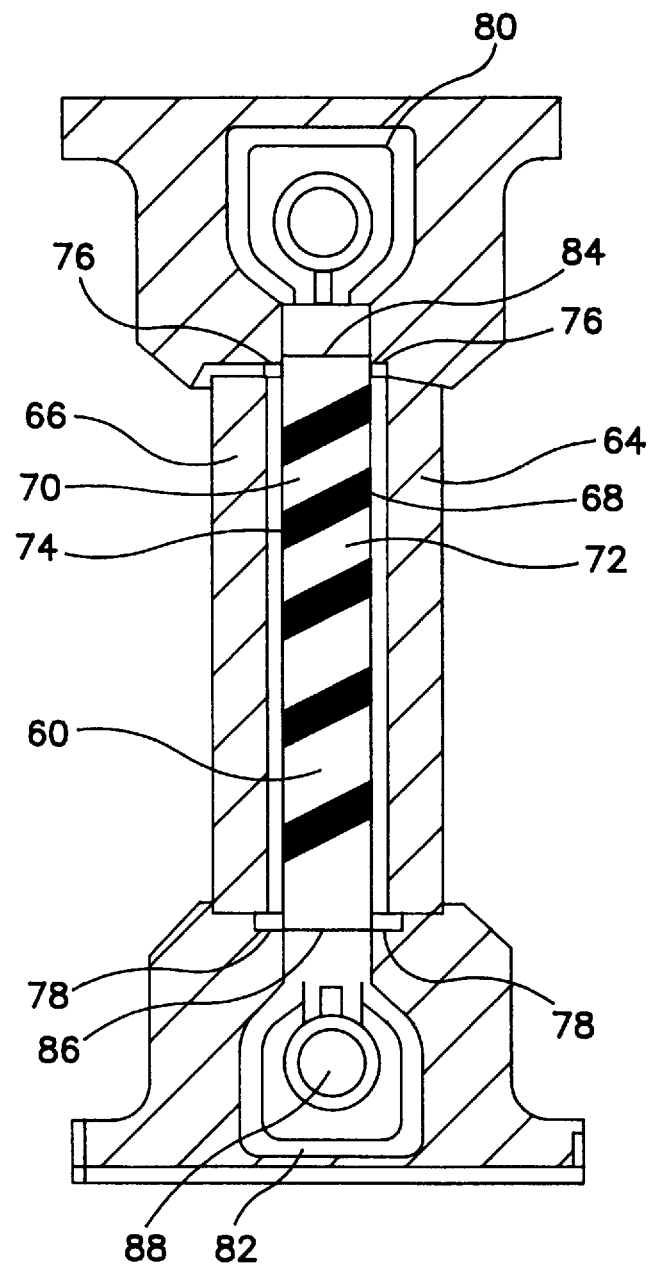
FIG. 6 illustrates also an end view of a cooling system for a slab geometry gain medium according to the present invention.

Referring to FIG. 6, the present invention provides a cooling system 58 for a solid state gain medium 60 generating laser output laser emission at a wavelength from about 2 μm to about 3 μm. The cooling system 58 is located proximate the gain medium 60 to provide cooling of the gain medium 60. Advantageously, the cooling system 58 of the present invention includes a coolant material for reducing absorption of laser emissions by the coolant at wavelengths from about 2 μm to about 3 μm.

Preferably, the gain medium 60 is a slab geometry solid state gain medium having pump faces, with the coolant flowing across the pump faces, wherein evanescent waves from the gain medium penetrating the coolant are substantially unabsorbed by the coolant. The coolant can be any material with a minimal absorption of laser energy from about 2 μm to about 3 μm. Preferably the coolant consists essentially of $D_2O$ or liquid fluorocarbons. $D_2O$ is advantageous in that it has the good thermal properties of water, making it an ideal coolant, and yet with minimal absorption of evanescent waves at the above lasing wavelengths.

The embodiment of the cooling system 58 of the present invention shown in FIG. 6 includes a pair of generally rectangular shaped windows 64, 66 disposed on opposite sides of the laser gain medium 60. The windows 64, 66 are adjacent and parallel to the laser gain medium 60 so as to define coolant flow channels 68, 70, through which a coolant is flowed longitudinally over major side faces 72, 74 of the laser gain medium 60.

The windows 64, 66 are preferably composed of sapphire. Other suitable materials having thermal expansion properties close to those of sapphire may optionally be used. Seals 76, 78 are positioned at the upper and lower faces of the windows 64, 66, respectively, to seal the laser gain medium 60 as coolant is passed through the flow channels 68, 70. The seals 76, 78 are preferably composed of a pure silicone rubber material. The seals 76, 78 may optionally be formed of other suitable light transmitting materials. The seals 76, 78 are carefully positioned with respect to the laser gain medium 60 to minimize thermal gradients in the laser gain medium 60 that degrade optical performance. The gain medium 60 can be a gain medium according to present invention described above. In that case, the seals and any necessary holders can be positioned to be in contact with the transparent layers instead of the gain layer of the gain medium 60. As such, the seals or holders do not block pumping radiation.

A coolant distribution system can be utilized to distribute coolant to the coolant flow channels 68, 70 between the respective windows 64, 66 and the laser gain medium 60. The coolant is preferably $D_2O$ or other equivalent coolants according to the present invention. The present invention contemplates other embodiments of a cooling system for cooling a solid state gain medium utilizing a coolant with reduced absorption of laser energy from about 2 μm to about 3 μm.

Figure 7:
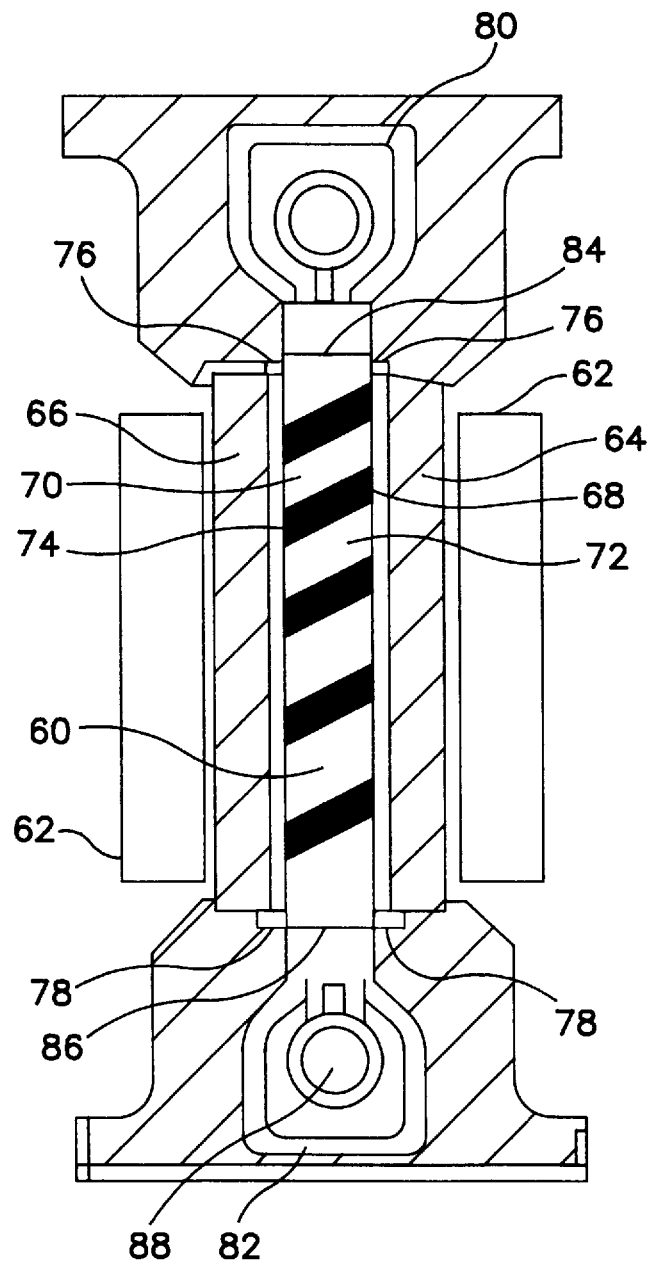
FIG. 7 illustrates the cooling system of FIG. 6 including laser diode pump sources oriented a, shown in FIG. 4.

FIG. 7 illustrates the cooling system of FIG. 6 including an excitation mechanism 62 located proximate a uni-axial birefringent crustal gain medium 60 for producing radiation intensity to the gain medium 60. The excitation mechanism 62 can comprise a set of diodes vertically oriented to generate radiation polarized along the c-axis of the crystal as described above.

EXAMPLE

Figure 8:
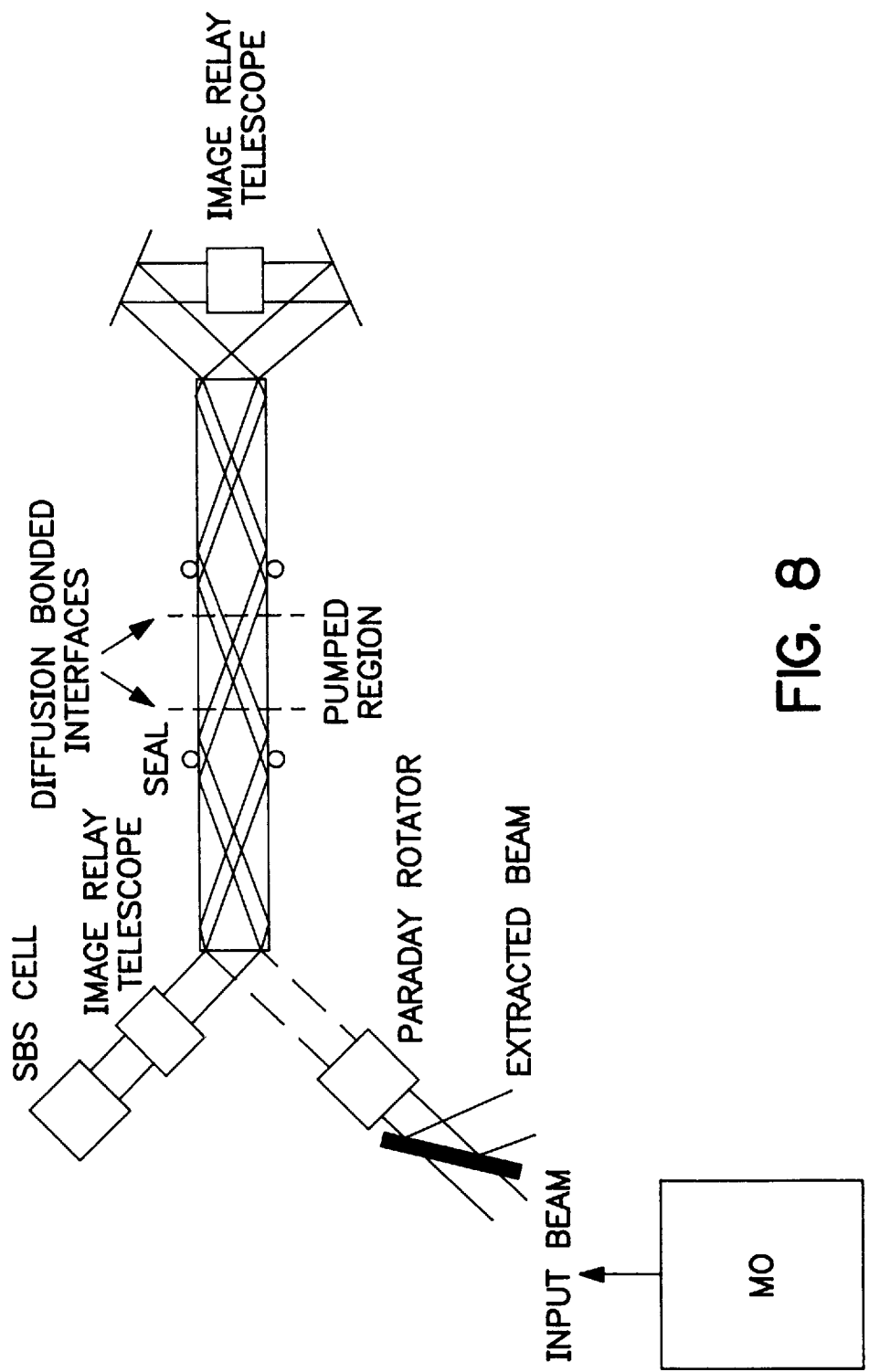
FIG. 8 illustrates a block diagram of an example phase conjugated MOPA architecture utilizing the gain medium of FIG. 2.

FIG. 8 illustrates a block diagram of a phase conjugated MOPA architecture laser system. The laser system includes a Master Oscillator (MO), a Faraday Rotator (FR), an amplifier or gain medium, an SBS cell and two image relay telescopes assembled as shown. The gain medium is a birefringent crystalline host material according to the present invention.

The master oscillator provides a source of radiation that is injected into the amplifier where it is amplified to provide desired higher power output laser radiation. The master oscillator comprises a low energy, high phase front quality, and high spectral purity laser oscillator which provides pulses of laser radiation. The pulses have a duration and wavelength determined by the desired laser application as well as the type of oscillator medium used.

The gain medium element is disposed along an optical path extending between a phase conjugate reflector (SBS cell) disposed on one end and an optical coupler on the other. The energy from the master oscillator is coupled into the gain medium using an optical coupler (Faraday Isolator) to selectively couple the output from the master oscillator along the optical path through the gain medium. The coupling means is also configured to prevent all but a very small percentage of radiation exiting the amplifier stage from re-entering the master oscillator.

In operation, a pulse traversing the gain medium is amplified by creating emissions from energetically pumped atoms or molecules present. A similar process occurs for the reflected pulse. Gain in general is proportional to the stored energy in an amplifier gain medium. The extraction geometry of the amplifier is:

| | |
|---|---|
| Input Angle | 46 degrees |
| Zig-Zag Angle | 70 degrees |
| Number of Passes | 2 symmetric passes before SBS, 4 total |
| Polarization | vertical polarization throughout |
| The SBS cell specification includes: | |
| SBS Medium | Xe gas or other SBS media transparent at 2 millions |
| Input Pulse Length | 10 ns–1000 ns |
| Injection Geometry | Simple focus |

The gain medium is a slab having a rectangular cross-section, and includes optically polished major side and end faces, and lateral pump faces perpendicular to the major side faces. The input light wave impinges on an edge face of the laser gain medium and the electromagnetic radiation emitted by a pumping source impinges upon the pump faces of the laser gain medium to excite the active species to create a population inversion. The pumping source includes laser diodes oriented as discussed above. The interaction of the light wave with the excited atoms amplifies the light wave. Coolant, consisting essentially of $D_2O$, is flowed across the faces of the slab by a cooling system described above.

The present invention has been described in considerable detail with reference to certain preferred versions thereof;

however, other versions are possible. Therefore, the spirit and scope of the appended claims should not be limited to the description of the preferred versions contained herein.

What is claimed:

1. A solid state laser gain medium for use in a laser apparatus, comprising:
   (a) a gain layer having pump regions and a first and a second contact region, the gain layer generating laser radiation at a lasing wavelength in response to pumping radiation pulses at the pump regions;
   (b) a first transparent layer optically connected to the first contact region of the gain layer by diffusion bonding; and
   (c) a second transparent layer optically connected to the second contact region of the gain layer by diffusion bonding;
   wherein the transparent layers are transparent to the lasing wavelength to reduce absorption of the laser radiation by the transparent layers and wherein each transparent layer is sized to be retained by a retainer.

2. The solid state laser gain medium of claim 1 wherein the transparent layers are sized to cooperate with a laser cooling system.

3. The solid state laser gain medium of claim 1 wherein the gain layer and the transparent layers are of the same crystalline material.

4. The solid state laser medium of claim 3 wherein the gain layer is ion doped and the transparent layers are undoped.

5. The solid state laser medium of claim 4 wherein the crystal material is selected from the group consisting essentially of YLF, YAG, YAP, YSGG, YSAG, GSGG, LiSAF, LiCAF, SFAP and glass.

6. The solid state laser medium of claim 5 wherein the dopant material is selected from the group consisting essentially of holmium, thulium, erbium, ytterbium and chromium.

7. A solid state laser gain medium for use in a laser apparatus, comprising:
   (a) a gain layer having pump regions and a first and a second contact region, the gain layer generating laser radiation at a lasing wavelength in response to pumping radiation pulses at the pump regions;
   (b) a first transparent layer optically connected to the first contact region of the gain layer by diffusion bonding; and
   (c) a second transparent layer optically connected to the second contact region of the gain layer by diffusion bonding;
   wherein the transparent layers are transparent to the lasing wavelength to reduce absorption of the laser radiation by the transparent layers, wherein the laser medium is a solid state, slab geometry laser medium, and wherein the pumping regions include lateral pumping faces and the contact regions are substantially transverse to the lateral pumping faces.

8. An apparatus for amplifying laser light, comprising:
   (a) a solid state, slab geometry laser medium having:
      (1) lateral pump faces; and
      (2) a principal radiation absorption axis; and
   (b) an excitation mechanism located along the pump faces of the gain layer for generating radiation intensity, wherein the excitation mechanism is oriented to generate radiation polarized in parallel with the principal absorption axis of the laser medium to provide increased radiation absorption.

9. The apparatus of claim 8 wherein the laser medium is a uni-axial birefringent crystal having a c-axis, and wherein the principal radiation absorption axis is along the c-axis.

10. The apparatus of claim 9 wherein the crystal is selected from the group consisting essentially of YLF, YAP, LiSAF, LiCAF, and SFAP.

11. The apparatus of claim 9 wherein the excitation mechanism comprises a set of laser diodes oriented to generate radiation polarized in parallel with the principal absorption axis of the laser medium.

12. The apparatus of claim 11, wherein:
   (a) the laser medium further comprises:
      (1) a length;
      (2) a width;
      (3) a height; and
      (4) a c-axis along said height;
      wherein the principal absorption axis is along the c-axis and lateral pump faces are along said length; and
   (b) the laser diodes are oriented to generate radiation polarized in parallel with the c-axis of the laser medium.

13. The apparatus of claim 8 further comprising a lens placed between the diodes and the laser medium to focus the polarized radiation of the diodes along the principal absorption axis of the laser medium.

14. An apparatus for amplifying laser light, comprising:
   (a) a solid state laser gain medium;
   (b) an excitation mechanism located proximate the solid state laser gain medium for producing radiation intensity to the gain medium, whereby the gain medium generates Laser output laser emission at a wavelength from about 2 µm to about 3 µm; and
   (c) a cooling system located proximate the solid state laser gain medium to provide cooling of the gain medium, the cooling system including a coolant material for reducing absorption of the laser emission by the coolant at said wavelength.

15. The apparatus of claim 14 wherein the coolant material consists essentially of $D_2O$.

16. The apparatus of claim 14 wherein the coolant material consists essentially of liquid fluorocarbons.

17. The apparatus of claim 14 wherein the solid state gain medium is a slab geometry solid state gain medium having pump faces, with the coolant flowing across the pump faces, wherein evanescent waves from the gain medium penetrating the coolant are substantially unabsorbed by the coolant.

18. The apparatus of claim 14 wherein the solid state laser gain medium is a holmium doped crystalline structure.

19. The apparatus of claim 14 wherein the solid state laser gain medium is a thulium doped crystalline structure.

20. The apparatus of claim 14 wherein the solid state laser gain medium is a ytterbium doped crystalline structure.

21. The apparatus of claim 14 wherein the solid state laser gain medium is a chromium doped crystalline structure.

22. An apparatus for amplifying laser light, comprising:
   (a) a solid state, slab geometry laser gain medium having pump faces;
   (b) an excitation mechanism located proximate the solid state laser gain medium for producing radiation intensity to the gain medium, whereby the gain medium generates laser output laser emission at a wavelength in the range of 1.5 µm to about 3 µm; and
   (c) a cooling system located proximate the solid state laser gain medium to provide cooling of the cain medium across said pump faces, the cooling system including a coolant material for reducing absorption of evanescent laser emission by the coolant at said wavelength, wherein the coolant material consists essentially of D$_2$O or liquid fluorocarbons.

23. An apparatus for amplifying lacer light, comprising:
(a) solid state laser gain medium comprising:
  (1) a solid state, slab geometry gain layer having lateral pump faces, a principal radiation absorption axis and a first and a second contact faces, the gain layer generating laser radiation at a lasing wavelength from about 1.5 μm to about 3 μm in response to pumping radiation pulses at the pump faces;
  (2) a first transparent layer optically connected to the first contact region of the gain layer by diffusion bonding; and
  (3) a second transparent layer optically connected to the second contact region of the gain layer by diffusion bonding;
  wherein the transparent layers are transparent to the lasing wavelength to reduce absorption of the laser radiation by the transparent layers;
(b) an excitation mechanism located along the pump faces of the gain layer, the excitation mechanism comprising a set of laser diodes to generate radiation intensity, wherein the diodes are oriented to generate radiation polarized in parallel with the principal absorption axis of the gain layer to provide increased radiation absorption; and
(c) a cooling system located proximate the gain layer to provide cooling of the gain layer, the cooling system including a coolant material flowing across the pump faces, wherein the coolant reduces absorption of evanescent laser emission at said wavelength by the coolant.

24. The apparatus of claim 22 wherein each transparent layer is sized to be retained by a retainer.

25. The apparatus of claim 22 wherein the transparent layers are sized to cooperate with the cooling system.

26. The apparatus of claim 22 wherein the gain layer is a uni-axial birefringent crystals having a c-axis, and wherein the principal radiation absorption axis is along the c-axis.

27. The apparatus of claim 25 wherein the gain layer and the transparent layers are of the same crystalline material.

28. The apparatus of claim 26 wherein the gain layer is ion doped and the transparent layers are undoped.

29. The apparatus of claim 27 wherein the crystal material is selected from the group consisting essentially of YLF, YAG, YAP, YSGG, YSAG, GSGG, GGG, LiSAF, LiCAF, SFAP and glass.

30. The apparatus of claim 28 wherein the dopant material is selected from the group consisting essentially of holmium, thulium, chromium, ytterbium and erbium.

31. The apparatus of claim 29 wherein the coolant material consists essentially of D$_2$O and liquid fluorocarbons.

32. An apparatus for amplifying laser light, comprising:
(a) solid state laser gain medium comprising:
  (1) a solid state, slab geometry gain layer having lateral pump faces, a principal radiation adsorption axis and a first and a second contact faces, the gain layer generating laser radiation at a lasing wavelength in the range of 1.5 μm to about 3 μm in response to pumping radiation pulses at the pump faces;
  (2) a first transparent layer optically connected to the first contact region of the gain layer by diffusion bonding; and
  (3) a second transparent layer optically connected to the second contact region of the gain layer by diffusion bonding;
  wherein the transparent layers are transparent to the lasing wavelength to reduce absorption of the laser radiation by the transparent layers; and
(b) an excitation mechanism located along the pump faces of the gain layer for generating radiation intensity, wherein the excitation mechanism is oriented to generate radiation polarized in parallel with the principal absorption axis of the gain layer to provide increased radiation absorption.

33. The apparatus of claim 32 wherein:
(a) the gain layer and the transparent layers are of the same crystalline material; and
(b) the gain layer is ion doped and the transparent layers are undoped.

34. The apparatus of claim 32 wherein the gain layer is a uni-axial birefringent crystal having a c-axis, and wherein the principal radiation absorption axis is along the c-axis.

35. The apparatus of claim 33 wherein:
(a) the crystal material is selected from the group consisting essentially of YLF, YAP, LiSAF, LiCAF, and SFAP; and
(b) the dopant material is selected from the group consisting essentially of holmium, thulium, erbium, chromium and ytterbium.

36. The apparatus of claim 34 wherein the excitation mechanism comprises a set of laser diodes oriented to generate radiation polarized in parallel with the principal absorption axis of the gain layer.

* * * * *